US012143774B2

(12) United States Patent
Paamand

(10) Patent No.: US 12,143,774 B2
(45) Date of Patent: Nov. 12, 2024

(54) METHOD OF OPERATING A HEARING AID AND A HEARING AID

(71) Applicant: Widex A/S, Lynge (DK)

(72) Inventor: Rune Tore Mondadori Paamand, Humlebaek (DK)

(73) Assignee: Widex A/S, Lynge (DK)

( * ) Notice: Subject to any disclaimer, the term of this patent is extended or adjusted under 35 U.S.C. 154(b) by 112 days.

(21) Appl. No.: 17/950,284

(22) Filed: Sep. 22, 2022

(65) Prior Publication Data

US 2023/0099499 A1 Mar. 30, 2023

(30) Foreign Application Priority Data

Sep. 22, 2021 (DK) ............................ PA202100899

(51) Int. Cl.
*H04R 25/00* (2006.01)

(52) U.S. Cl.
CPC .................................. *H04R 25/505* (2013.01)

(58) Field of Classification Search
CPC ....... H04R 25/00; H04R 25/50; H04R 25/505
See application file for complete search history.

(56) References Cited

U.S. PATENT DOCUMENTS 5,694,349 A 12/1997 Pal
5,777,915 A 7/1998 Witte et al.
9,778,905 B1 10/2017 Walke
2017/0311094 A1* 10/2017 Andersen ............. H04R 25/505
2021/0274295 A1* 9/2021 Elmedyb ............... H04R 25/43

FOREIGN PATENT DOCUMENTS

WO 2020/089745 A1 5/2020

OTHER PUBLICATIONS

Danish first technical examination for PA 2021 00899 dated Mar. 25, 2022.

* cited by examiner

*Primary Examiner* — Tuan D Nguyen
(74) *Attorney, Agent, or Firm* — Sughrue Mion, PLLC

(57) ABSTRACT

A hearing aid having a digital processing unit (200) having at least four digital data inputs configured to provide four input signals, at least two digital data outputs configured to provide two output signals, and a calculation unit (100) having at least one switch and at least one first multiplexer configured to route the input signals from the digital data inputs to the digital data outputs. The first configuration of the at least one switch and the at least one first multiplexer provides a complex multiplication of the four input signals representing two complex numbers, and a second configuration of the at least one switch and the at least one first multiplexer provides parallel real multiplication of two pairs of input signals the four input signals representing four real numbers.

16 Claims, 5 Drawing Sheets

METHOD OF OPERATING A HEARING AID AND A HEARING AID

1. FIELD OF THE INVENTION

The present invention relates to a method of operating a hearing aid. The present invention also relates to a hearing aid adapted to carry out said method. More specifically the present invention is also related to a hearing aid comprising a flexible calculation unit.

2. BACKGROUND OF THE INVENTION

Generally, a hearing aid according to the invention is understood as meaning any device which provides an output signal that can be perceived as an acoustic signal by a user or contributes to providing such an output signal, and which has means which are customized to compensate for an individual hearing loss of the user or contribute to compensating for the hearing loss of the user. They are, in particular, hearing aids which can be worn on the body or by the ear, in particular on or in the ear, and which can be fully or partially implanted. However, some devices whose main aim is not to compensate for a hearing loss, may also be regarded as hearing aids, for example consumer electronic devices (televisions, hi-fi systems, mobile phones, MP3 players etc.) provided they have, however, measures for compensating for an individual hearing loss.

Within the present context a traditional hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore, the hearing aid system may comprise an external device, such as a smart phone having software applications adapted to interact with other devices of the hearing aid system. Thus, within the present context the term "hearing aid system device" may denote a hearing aid or an external device.

The mechanical design has developed into a number of general categories. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In some modern types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids.

In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids. This type of hearing aid requires an especially compact design in order to allow it to be arranged in the ear canal, while accommodating the components necessary for operation of the hearing aid.

Hearing loss of a hearing impaired person is quite often frequency-dependent. This means that the hearing loss of the person varies depending on the frequency. Therefore, when compensating for hearing losses, it can be advantageous to utilize frequency-dependent amplification. Hearing aids therefore often provide to split an input sound signal received by an input transducer of the hearing aid, into various frequency intervals, also called frequency bands, which are independently processed. In this way, it is possible to adjust the input sound signal of each frequency band individually to account for the hearing loss in respective frequency bands. The frequency dependent adjustment is normally done by implementing a band split filter and compressors for each of the frequency bands, so-called band split compressors, which may be summarized to a multi-band compressor. In this way, it is possible to adjust the gain individually in each frequency band depending on the hearing loss as well as the input level of the input sound signal in a specific frequency range. For example, a band split compressor may provide a higher gain for a soft sound than for a loud sound in its frequency band.

The filter banks used in such multi-band compressors are well known within the art of hearing aids but are nevertheless based on a number of tradeoffs. Most of these tradeoffs deal with the frequency resolution as will be further described below.

There are some very clear advantages of having a high-resolution filter bank. The higher the frequency resolution, the better individual periodic components can be distinguished from each other. This gives a much finer signal analysis and enables more advanced signal processing. Especially noise reduction and speech enhancement schemes may benefit from a higher frequency resolution.

One well known type of high-resolution filter bank is based on Fourier Transformations such as Discrete Fourier Transforms (DFT). However, these transforms are generally disadvantageous in that they require a relatively large amount of chip area and hereby also are responsible for a significant part of the chip cost.

Furthermore, a filter bank with a high frequency resolution generally introduces a correspondingly long delay, which for most people will have a detrimental effect on the perceived sound quality.

It has therefore been suggested to reduce the processing delay incurred by filter banks such as Discrete Fourier Transform (DFT) and Finite Impulse Response (FIR) filter banks by: applying, in the signal processing branch, a time-varying filter with a response that corresponds to the frequency dependent target gains that were otherwise to be applied to the frequency bands provided by the filter banks. However, this solution still requires that the frequency dependent gains are calculated in an analysis branch of the system, and in case the analysis part comprises filter banks, then the requirements to processing resources will generally be significant.

Furthermore, the time-varying filter will in itself inherently introduce a delay although this delay is generally significantly shorter than the delay introduced by the filter banks. It has therefore been suggested in the art to minimize the delay introduced by the time-varying filter by implementing the time-varying filter as minimum-phase.

However, the task of synthesizing a time-varying filter as minimum-phase also generally requires significant processing resources. Thus, while low delay processing is attractive it remains a challenge to design hearing aid systems with low delay processing that don't suffer from high requirements to processing resources which generally leads to at least one of high current consumption and too high cost due to the required chip area, which translates into added cost.

Thus, while the use of Fourier transformation and related calculations are an essential element of audio signal processing for many contemporary hearing aids, it remains a challenge to fulfil the requirement for processing resources while keeping the associated costs low, notably by avoiding a too large digital chip area.

It is therefore a feature of the present invention to provide an improved method of operating a hearing aid especially with respect to minimizing digital chip area.

It is another feature of the present invention to provide a hearing aid adapted to provide such a method of operating a hearing aid.

3. SUMMARY OF THE INVENTION

The invention, in a first aspect, provides a hearing aid according to claim 1.

The invention, in a second aspect, provides a method of operating a hearing aid according to claim 11.

The invention, in a third aspect, provides a non-transitory computer readable medium according to claim 14.

Further advantageous features appear from the dependent claims.

Still other features of the present invention will become apparent to those skilled in the art from the following description wherein the invention will be explained in greater detail.

4. BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

5. DETAILED DESCRIPTION

In the present context the term signal processing is to be understood as any type of hearing aid related signal processing that includes at least: noise reduction, speech enhancement and hearing compensation.

Additionally, in the following, the term digital input signal may be used interchangeably with the term input signal and the same is true for all other signals referred to in that they may or may not be specifically denoted as digital signals.

It is also noted that the terms "Fourier Transform" (FT), "Discrete Fourier Transform" (DFT) and "Fast Fourier Transform" (FFT) may be used interchangeably. FT is the most general term, DFT is the discrete version of the FT and FFT is any efficient algorithm for calculating a DFT.

It is a central aspect of the present invention that the hearing aid according to the invention comprises a flexible calculation unit, however the term "calculation unit" may be used interchangeably with "flexible calculation unit"

Figure 1:
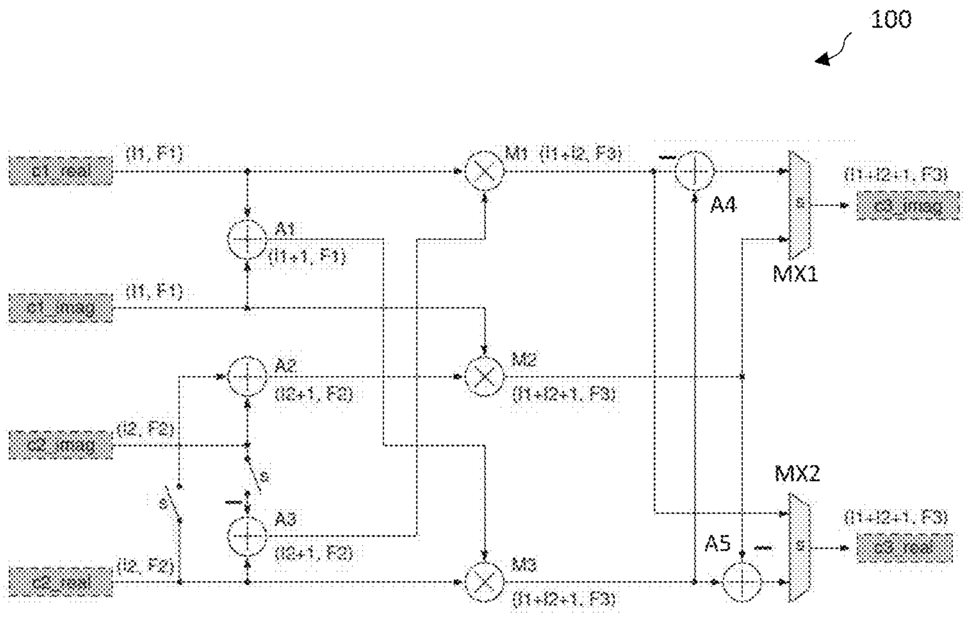
FIG. 1 illustrates highly schematically a flexible calculation unit according to an embodiment of the invention.

Reference is first made to FIG. 1, which illustrates highly schematically a flexible calculation unit 100 of a hearing aid according to an embodiment of the invention. The calculation unit 100 provides multiplication of two complex numbers or multiplication of two pairs of real numbers in parallel. Selection between these two modes of operation is made by switch s: when switch s is closed, multiplication of complex numbers is performed, and when switch s is open, multiplication of real numbers is performed. Thus, in the context of hearing aid signal processing, the flexible calculation unit 100 can be used for e.g. analysis window multiplication which typically is a multiplication of real-valued data and real-valued window factors, and for butterfly operations within a FFT wherein the butterfly multiplier is a complex multiplier.

The calculation unit 100 comprises at least one switch and at least one first multiplexer configured to route said input signals from said digital data inputs to said digital data outputs. A first configuration of said at least one switch and said at least one first multiplexer provides a complex multiplication of said four input signals representing two complex numbers. A second configuration of said at least one switch and said at least one first multiplexer provides parallel real-valued multiplication of two pairs of input signals of said four input signals representing four real numbers.

More specifically, as illustrated in FIG. 1, calculation unit 100 has four inputs:

$$c1\_real, c1\_imag, c2\_imag, c2\_real$$

which are defined as follows:

$$c1\_real=\mathrm{Re}(c1); c1\_imag=\mathrm{Im}(c1)$$

$$c2\_real=\mathrm{Re}(c2); c2\_imag=\mathrm{Im}(c2)$$

wherein c1, c2 denote complex numbers, and wherein the functions Re and Im denote the real part and the imaginary part of a complex number, respectively. As also indicated in FIG. 1, Re(c1) and Im(c1) are represented as (I1, F1), wherein I1 denotes the bit width of the integer part and F1 denotes the bit width of a floating point part. Accordingly, Re(c2) and Im(c2) are represented as (I2, F2), wherein (I2, F2) may differ from (I1, F1).

Further, calculation unit 100 comprises three input adders. In the first configuration, each input adder receives a pair of input signals. In the second configuration, a pair of input signals is provided to a first adder, and each of the remaining input signals is provided as a single input to the remaining input adders, respectively.

More in detail, as also illustrated in FIG. 1, calculation unit 100 comprises adders A1, A2, A3. Adder A1 receives inputs c1_real, c1_imag; adder A2 receives inputs c2_real, c2_imag; and adder A3 receives inputs c2_real and the negative of c2_imag. The bit width of adder A1 is (I1+1, F1), the bit width of adder A2 is (I2+1, F1), and the bit width of adder A3 is (I2+1, F2).

Further, calculation unit 100 comprises three multipliers. In the first configuration, each multiplier receives an input from an input signal and an input adder. In the second configuration, two multipliers receive input from an input signal and from an input adder which received a single input, and wherein the outputs from the two multipliers represent the two output signals of the second configuration.

More in detail, calculation unit 100 further comprises multipliers M1, M2, M3. Multiplier M1 receives input c1_real and the output of adder A3; multiplier M2 receives inputs c1_imag and the output of adder A2; and multiplier M3 receives inputs c2_real and the output of adder A1. The bit width of multiplier M1 is (I1+I1, F3), and the bit width of multipliers M2 and M3 is (I1+I1+1, F3), wherein F3 is the maximum of F1 and F2.

Further, calculation unit 100 comprises two output adders. In the first configuration, each output adder receives input from two multipliers, wherein the outputs from the two output adders represent the two output signals of the first configuration.

More in detail, calculation unit 100 further comprises output adders A4 and A5. Output adder A4 receives the negative output of multiplier M1 and the output of multiplier M3. Output adder A5 receives the negative output of multiplier M2 and the output of multiplier M3.

The output of calculation unit 100 is c3_imag and c3_real, which are provided by multiplexers MX1 and MX2, respectively. The bit width of c3_imag and c3_real is (I1+I1+1, F3). Multiplexer MX1 receives input from adder A4 and multiplier M2, multiplexer MX2 receives inputs from multiplier M1 and adder A5.

Switching between complex and real multiplication is achieved by switch s which separates input c2_real from adder A2 and input c2_imag from adder A3. Switch s also acts on multiplexers MX1 and MX2. Operation of switch s will be described in the following.

It is estimated that the flexible calculation unit only takes up 50% of the chip area required by known prior art implementations because of its ability to reuse the area-wise expensive complex multiplier for other calculations including real-valued multiplications in window operations and the calculation of complex exponentials (see below).

In the following, multiplying two complex numbers is described which e.g. can be used as input to either radix-2 or radix-4 sums, hereby providing the butterfly calculations that are at the heart of calculating e.g. an FFT or DFT.

The multiplication of two complex numbers c1, c2 is achieved by calculation unit 100 as follows, wherein switch s is closed and selects the upper port of multiplexer MX1 and the lower port of multiplexer MX2, as described below.

For ease of representation, the following abbreviations are introduced:

$$c1\_real=a; c1\_imag=b \tag{1}$$

$$c2\_real=c; c2\_imag=d \tag{2}$$

Thus, $$c1=a+ib; c2=c+id$$

$$c3=c1*c2=(a+ib)(c+id)=ac-bd+i(bc+ad)$$

$$\mathrm{Re}\ c3=\mathrm{Re}\ c1*c2=ac-bd \tag{3}$$

$$\mathrm{Im}\ c3=\mathrm{Im}\ c1*c2=bc+ad \tag{4}$$

Using these notations, the output of adders A1, A2, A3 is:

$$a+b\ \ A2{:}c+d\ \ A3{:}c-d \qquad A1{:}$$

The output of multipliers M1, M2, M3 is:

$$a(c-d)M2{:}b(c+d)M3{:}c(a+b) \qquad M1{:}$$

The output of adder A4 is:

$$c(a+b)-a(c-d)=bc+ad \qquad A4{:}$$

Thus, according to equation (4) above, the output of adder A4 is the imaginary part of the multiplication of c1 and c2, i.e. the imaginary part of c3. This result is delivered to the upper port of multiplexer MX1, activated by switch s.

The output of adder A5 is:

$$c(a+b)-b(c+d)=ac-bd \qquad A5{:}$$

Thus, according to equation (3) above, the output of adder A5 is the real part of the multiplication of c1 and c2, i.e. the imaginary part of c3. This result is delivered to the lower port of multiplexer MX2, activated by switch s.

As a result, the imaginary part of c3, i.e. the multiplication of c1 and c2, is provided at the upper port of multiplexer MX1, and the real part of c3 is provided at the lower port of multiplexer MX2.

In the following, multiplying real numbers is described which can be used, for example, for real-valued window operations that are required before or in the first stage of an FFT (or DFT) calculation The multiplication of two real numbers a, c and the multiplication of two real numbers b, d in parallel is achieved as follows, by opening switch s and simultaneously selecting the lower port of multiplexer MX1 and the upper port of multiplexer MX2.

Using the notations introduced in equations (1) and (2) above, real numbers a, b are provided to the first and the second input port of calculation unit 100, respectively, instead of c1_real and c1_imag, and real numbers c, d are provided to the fourth and the third input port of calculation unit 100, respectively, instead of c2_real and c2_imag.

The, the output of adders A1, A2, A3 is:

$$A1{:}a+b\ \ A2{:}d\ \ A3{:}c$$

The output of multipliers M1, M2, M3 is:

$$M1{:}ac\ \ M2{:}bd\ \ M3{:}c(a+b)$$

The output of multiplier M2, bd, is provided to the lower part of multiplexer MX1 (selected by switch s), and the output of multiplier M1, ac, is provided to the upper part of multiplexer MX2 (also selected by switch s).

As a result, multiplication of two real numbers a, c and the multiplication of two real numbers b, d in parallel is achieved by opening switch s in calculation unit 100 in FIG. 1.

Such multiplications of two real numbers can be used for e.g. real valued window operations that are required before or in a first stage of an FFT (or DFT) calculation.

As already discussed digital signal processing in contemporary hearing aids often involves the sequence of determining a FFT and subsequently determining an inverse FFT.

In a FFT-based filter engine, the data going out of an FFT computation may be in a log base-2 domain. In a subsequent inverse FFT operation, linear input data may be required to calculate a minimum phase FIR impulse response. The real and imaginary part of the data are handled separately, thus the two functions, $2^{real(z)}$ and $e^{j\ imag(z)\ loge(2)}$ are needed. According to an application of the invention the complex exponential function $$e^{i\alpha}=\cos\alpha+i\sin\alpha,$$

may be determined by exploiting the symmetry of the two trigonometric function to compute both "at the same time"—using only two times two table lookups and two multiplications. Such a calculation may advantageously make use of the flexible calculation unit 100 according to the present invention, whereby the result of the two multiplications may be provided simultaneously.

Figure 2:
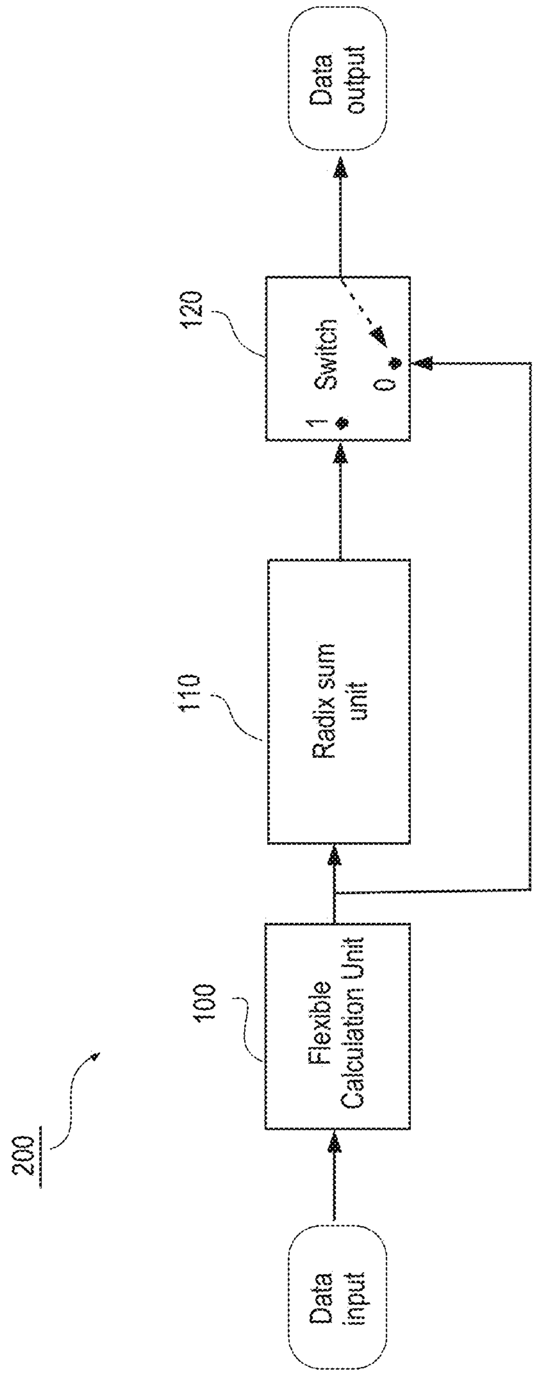
FIG. 2 illustrates highly schematically a digital processing unit according to an embodiment of the invention.

Reference is now made to FIG. 2, which illustrates highly schematically a digital processing unit 200 according to an embodiment of the invention.

A central element of digital signal processing in many contemporary hearing aids is calculation of FFTs as already discussed above and for this a so called butterfly calculation is often used, which requires calculation of a radix-sum and as part hereof a complex multiplication. As illustrated highly schematically in FIG. 2 the digital processing unit 200 enables calculation of both radix-2 and radix-4 sums based on the use of the flexible calculation unit 100 and the radix sum unit 110. However, the digital processing unit 200 also provides that real or complex multiplications may be used for other purposes than radix sums by using the switch 120.

The concept of radix sums in the context of calculating Fourier Transformations is well known for the skilled person and consequently the radix sum unit will not be described in further detail.

When the switch 120 of the digital processing unit 200, is set to 1, and switch s in the flexible calculation unit 100 is closed so that complex multiplications are performed then the digital processing unit 200 can calculate both radix-2 sums and radix-4 sums dependent on the setting of the radix sum unit 110. According to a more specific embodiment calculation of a FFT consists of five mains stages, denoted FFT stage 0 to FFT stage 4. In FFT stages 0 and 4, complex-valued multiplications with predefined twiddle factors and subsequent calculation of radix-2 sums are performed. In FFT stages 1 to 3, complex-valued multiplications with predefined twiddle factors and radix-4 sums are performed.

On the other hand when the switch 120 of the digital processing unit 200, is set to 0, and switch s in the flexible calculation unit 100 is opened then real-valued multiplications or complex multiplications may be performed without radix sums, and as such be used for calculations that are not directly related to the calculation of Fourier transformations, e.g. calculations for performing windowing operations or in the context of calculating complex exponentials as described above.

The flexible calculation unit 100 is configured to receive either four real numbers or two complex numbers as input. Depending on the respective mode of operation, these data may be input data, twiddle factors, or window factors for windowing operations in the context of FFT, or they may be external factors used for other operations involving multiplications of complex or real numbers, as already described above.

Figure 4:
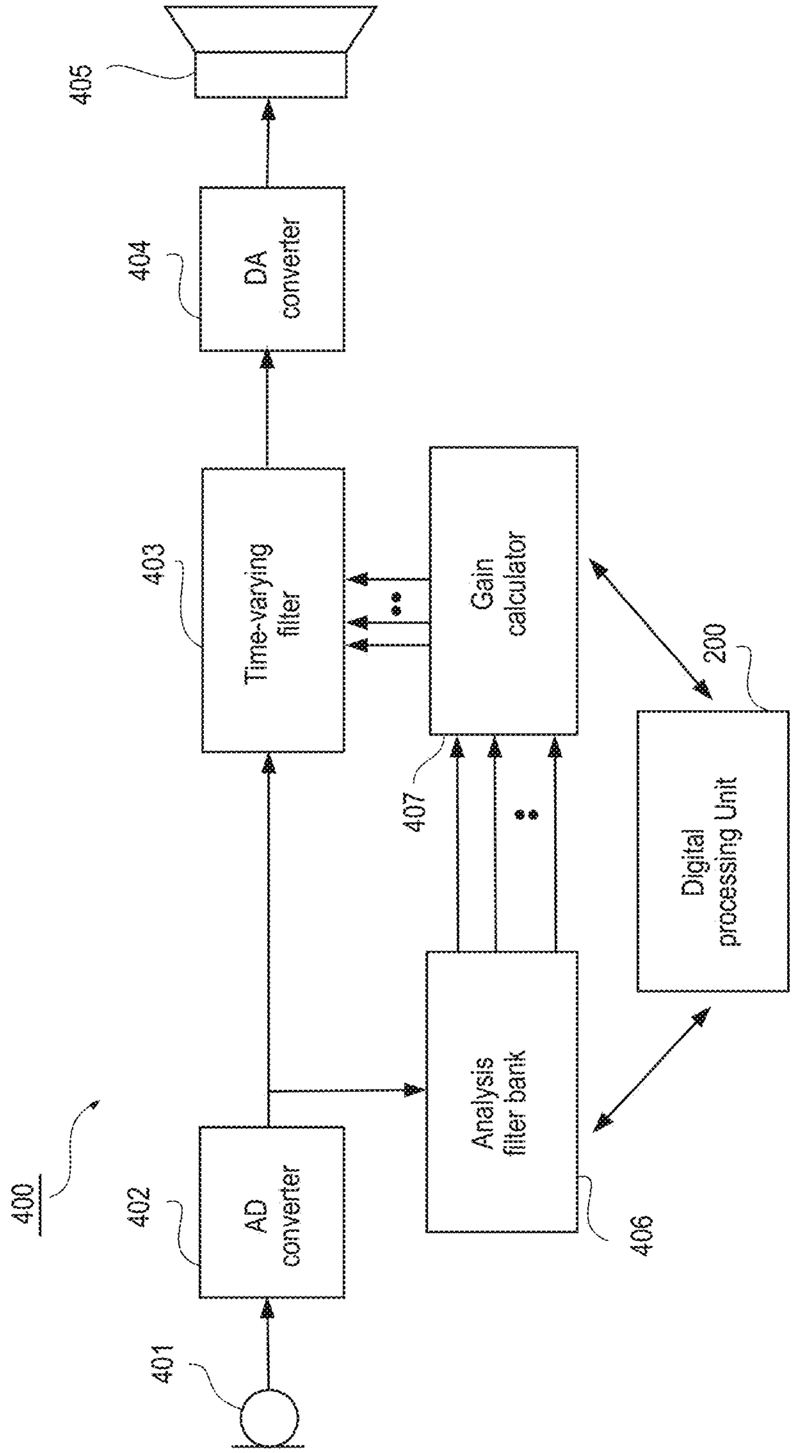
FIG. 4 illustrates highly schematically a hearing aid according to another embodiment of the invention.

FIG. 4 illustrates highly schematically a hearing aid 400 according to an embodiment of the invention. The hearing aid 400 comprises an acoustical-electrical input transducer 401, i.e. a microphone, an analog-digital converter (ADC) 402, a time-varying filter 403, a digital-analog converter (DAC) 404, an electro-acoustical output transducer, i.e. the hearing aid speaker 405, an analysis filter bank 406, a gain calculator 407 and a digital processing unit 200. The digital processing unit 200 comprises a flexible calculation unit 100.

According to the embodiment of FIG. 4, the microphone 401 provides an analog input signal that is converted into a digital input signal by the analog-digital converter 402. However, in the following, the term digital input signal may be used interchangeably with the term input signal and the same is true for all other signals referred to in that they may or may not be specifically denoted as digital signals.

The digital input signal is branched, whereby the input signal, in a first branch (that may also be denoted the main signal branch), is provided to the time-varying filter 403 and, in a second branch (that may also be denoted the analysis signal branch), provided to the analysis filter bank 406. The digital input signal, in the first branch, is filtered by the time-varying filter 403 that applies a frequency dependent target gain. This filtered digital signal is subsequently provided to the digital-analog converter 404 and further on to the acoustical-electrical output transducer 405 for conversion of the signal into sound.

The digital input signal, in the second branch, is split into a multitude of frequency band signals by the analysis filter bank 406 and provided to the gain calculator 407 that determines the frequency dependent target gain to be applied by the time-varying filter 403, which gain is adapted to alleviating a hearing deficit of an individual wearing the hearing aid 400 and additionally adapted to at least one of suppressing noise, improving speech intelligibility, enhancing a target sound, and customizing the sound to a user preference.

The analysis filter bank 406 may be implemented in the time-domain or in the frequency domain using e.g. a Discrete Fourier Transformation (DFT).

The digital-analog converter 404 may be implemented as a sigma-delta converter, e.g. as disclosed in EP-B1-793897. However, in the following the terminology digital-analog converter is used independent of the chosen implementation.

The digital processing unit 200 is configured such that it can contribute to a multitude of the different tasks required to determine the frequency dependent target gain for the time-varying filter 403. According to an embodiment these tasks comprise calculation of radix sums for the analysis filter bank 406 and real as well as complex valued multiplications for determining the frequency dependent target gain as carried out by the gain calculator 407.

According to one embodiment the digital processing unit 200 ensures itself that calculations for the gain calculator 407 are carried out in between calculations for the analysis filter bank 406. However, according to another embodiment this control of the order and synchronization of the tasks to be carried out by the digital processing unit 200 is controlled by other parts of the hearing aid 400.

Figure 3:
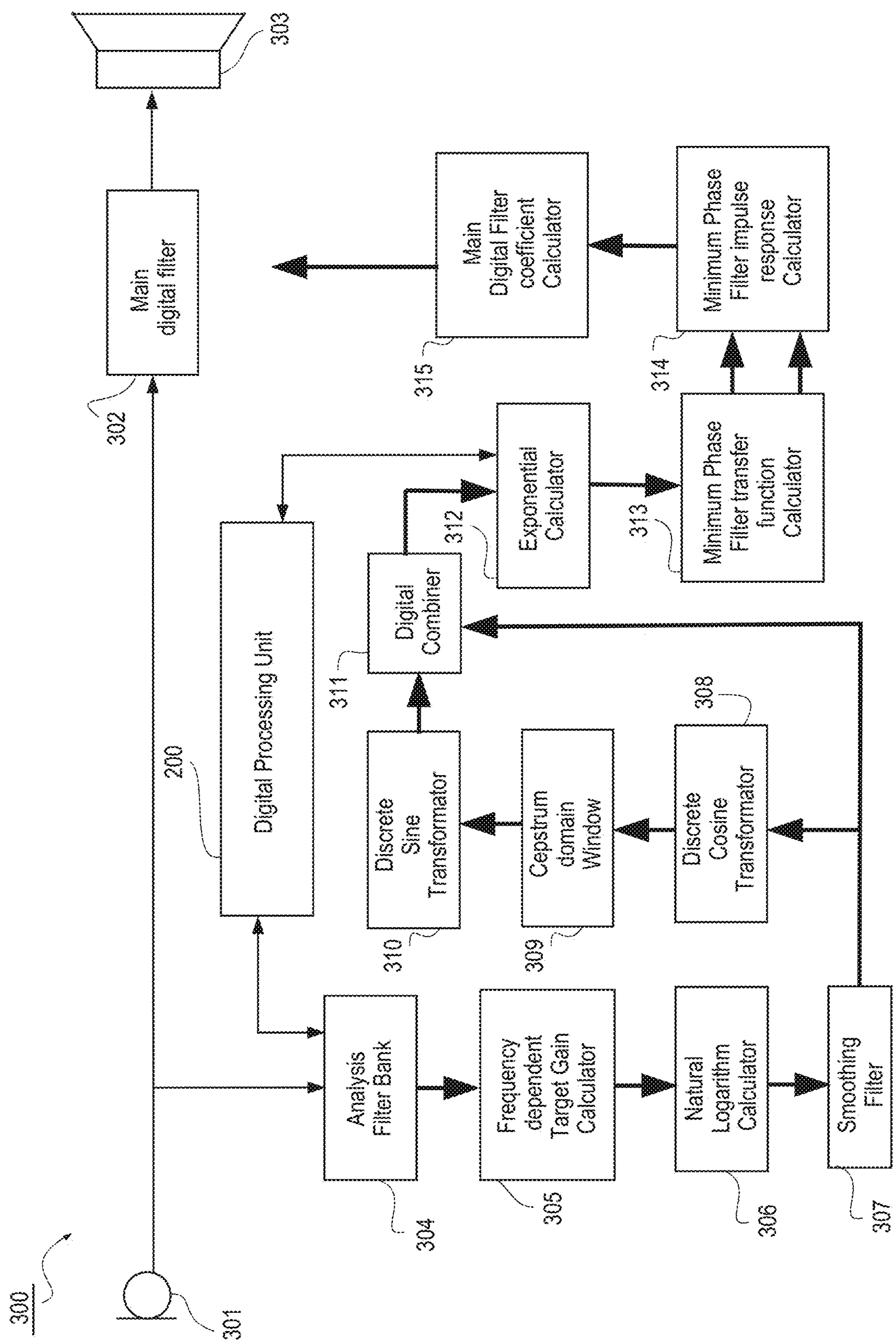
FIG. 3 illustrates highly schematically a hearing aid according to an embodiment of the invention.

Reference is now given to FIG. 3, which illustrates highly schematically a hearing aid 300 according to another embodiment of the invention. The hearing aid 300 is similar to the hearing aid 400 according to the embodiment of FIG. 4, but differs with respect to the specific details of the filter synthetization that provide filter coefficients to the time-varying filter 302 (that in the following also may be denoted main digital filter) such that the desired frequency dependent target gain is provided by the time-varying digital filter 302 while the time-varying digital filter 302 is also minimum phase.

In FIG. 3 some of the arrows are drawn in bold in order to illustrate a multitude of frequency bands that are initially provided by the analysis filter bank 304. The frequency band signals, which are at least derived from the at least one acoustical-electrical input transducer 301, are provided to a frequency dependent target gain calculator 305 wherein a frequency dependent target gain, adapted to at least one of suppressing noise, enhancing a target sound, customizing the sound to a user preference and alleviating a hearing deficit of an individual wearing the hearing aid, is determined. According to the present embodiment the number of frequency bands is 15, but in variations may be in the range between say 3 and 512.

The frequency dependent target gain is provided to a natural logarithm calculator 306 and therefrom to a smoothing filter 307 that is configured to limit the bin to bin variation of frequency dependent target gain to be below a pre-determined threshold in order to ensure that the chosen length of the time-varying filter 302 is sufficient to represent the desired frequency dependent target gain while being of minimum phase.

The smoothed frequency dependent target is branched and provided both to a digital combiner 311 and to a discrete cosine transformation circuit 308 that provides a real cepstrum of the frequency dependent target gain. Next a cepstrum domain window 309 is applied to the real cepstrum of the frequency dependent target gain in order to provide a complex cepstrum representing the desired minimum phase filter impulse response. The complex cepstrum is then provided to a discrete sine transformation circuit 310 and therefrom to the digital combiner 311 wherein the discrete sine transformation of the complex cepstrum, which represents a phase function, is combined with the logarithmic and smoothed frequency dependent target gain.

Subsequently the combined output from the digital combiner 311 is provided to an exponential calculator 312 that applies an exponential function and together with the minimum phase filter transfer calculator 313 provides a filter transfer function that is minimum phase. The minimum phase filter transfer function is then provided to a minimum phase impulse response calculator 314 wherein a discrete cosine transformation is applied to the product of the real part of the filter transfer function and a normalization function and adding the result to the result of applying a discrete sine transformation to the imaginary part of the filter transfer function whereby a desired minimum phase filter impulse response is provided. In the final step the desired minimum phase filter impulse response is provided to the main digital filter coefficient calculator 315 that determines the corresponding filter coefficents and updates the main filter 302 with the coefficients. Thus the hearing aid 300 provides a single minimum phase digital filter 302 adapted to provide at least one of suppressing noise, enhancing a target sound, customizing the sound to a user preference and alleviating a hearing deficit of an individual wearing the hearing aid.

As for the hearing aid 400 of the FIG. 4 embodiment, the hearing aid 300 of the present embodiment likewise comprises a digital processing unit 200, comprising a flexible calculation unit 100, that is configured to carry out a plurality of different tasks for the hearing aid 400.

Figure 5:
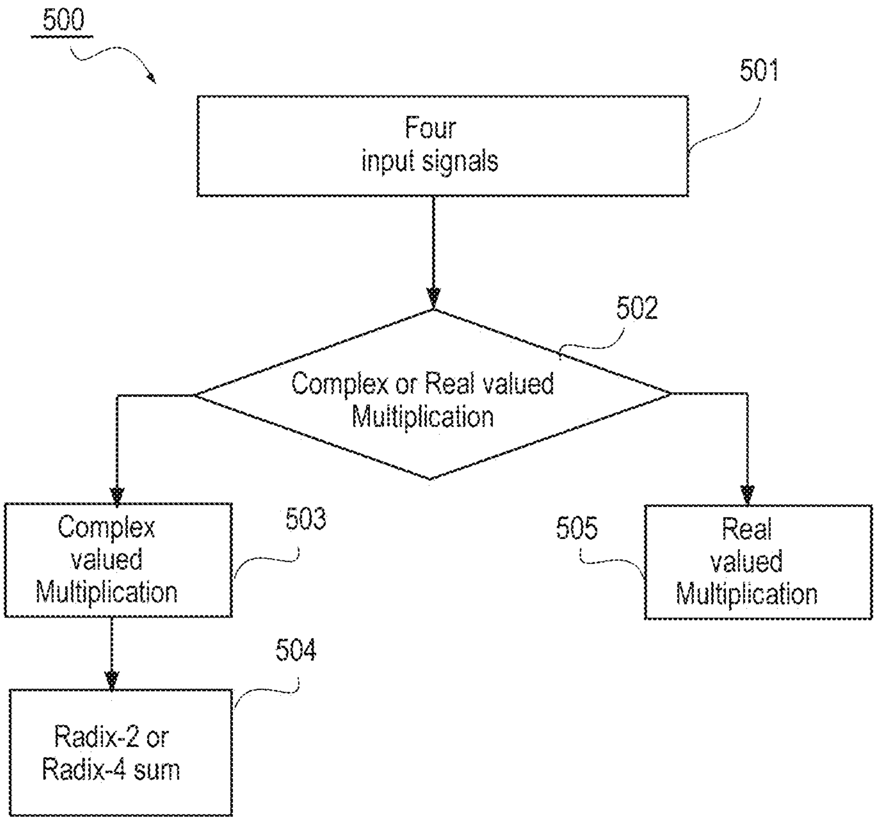
FIG. 5 illustrates highly schematically a method of operating a hearing aid according to an embodiment of the invention.

FIG. 5 illustrates highly schematically a method 500 of operating a hearing aid according to an embodiment of the invention. In a first step 501 four input signals representing either two complex-valued or four real-valued numbers are provided In a second step 502 it is determined whether a complex-valued or a real-valued multiplication is to be carried out and depending hereon either a complex-valued multiplication is carried out in step 503 or a real-valued multiplication is carried out in step 505. Optionally radix-2 or radix-4 sums are calculated in step 504. In case real valued multiplication 505 is selected, two pairs of the four real-valued input signals are multiplied in parallel, as described above.

According to an embodiment, the digital processing unit comprising the flexible calculation unit is used for at least two different tasks that are interleaved in time whereby chip area and hereby also cost can be saved. More specifically the flexible calculation unit may be used both for: —multiplication of real numbers in order to carry out real valued windowing operations e.g. as part of a Fast Fourier Transform (FFT), that is essential for a frequency domain filter bank, and for multiplication of complex numbers in order to carry out a complex exponential operation which is required for synthesizing e.g. a minimum phase filter.

Generally concerning time interleaving involving tasks for both frequency domain filter banks and e.g. hearing aid filter synthetization it is noted that the clock frequency of a contemporary hearing aid may be say 2 MHz, while the update frequency of the analysis filter bank may not be higher than say 1 kHz and consequently that the analysis filter bank and the filter synthetization block can share the resources of the complex calculation unit by using time interleaving.

According to another embodiment, the digital processing unit comprising the flexible calculation unit is used to carry out basically the same task (e.g. a real multiplication) for two different purposes. As above this may be achieved by interleaving the tasks in time. More specifically the flexible calculation unit may be used for multiplication of real numbers in order to carry out real valued windowing operations both for a frequency domain filter bank and for a minimum phase filter synthetization block. Thus, multiplication of real numbers is used in order to carry out real valued windowing operations e.g. as part of a Fast Fourier Transform (FFT), that is essential for a frequency domain filter bank, but e.g. also as part of a minimum phase filter synthetization.

Furthermore, the digital processing unit comprising the flexible calculation unit is advantageous in allowing calculation of Fourier transformations of any desired resolution, because it comprises both a radix-2 and a radix-4 butterfly.

As opposed hereto implementations that e.g. only consist of radix-4 butterflies can only determine Fourier transformations with a resolution that is a multiple of 4, i.e. 4, 16, 64, 256 and 1024.

On the other hand, if considering implementations that only consist of radix-2 butterflies then 7 time instants (i.e. samplings) are required for a Fourier transformation with a resolution of 128 (27), while only 4 time instants are required by combining a radix-2 and a radix-4 butterfly ($2\times4^3$), whereby the calculation time of this part is reduced with almost 50%, and additionally this configuration is estimated to use 25% less current as compared to a pure radix-2 implementation.

It is a specific advantage of the digital processing unit comprising the flexible calculation unit that it in a very simple manner can be configured for use in the butterfly operations that form the basis of a frequency domain (such as a DFT) filter bank or to apply a windowing function of the input signal in the beginning of the calculation required to obtain the frequency domain filter bank feature.

It is generally noted that even though many features of the present invention are disclosed in embodiments comprising other features then this does not imply that these features by necessity need to be combined.

In further variations the methods and hearing aids according to the disclosed embodiments may also be implemented in systems and devices that are not hearing aids (i.e. they do not comprise means for compensating a hearing loss), but nevertheless comprise both acoustical-electrical input transducers and electro-acoustical output transducers. Such systems and devices are at present often referred to as hearables. A headset is one example of such a system. Such systems also benefit from the lower cost of the systems and methods described above.

Other modifications and variations of the structures and procedures will be evident to those skilled in the art.

The invention claimed is:

1. A hearing aid comprising a digital processing unit (200) comprising:

at least four digital data inputs configured to provide four input signals, at least two digital data outputs configured to provide two output signals, a calculation unit (100) comprising at least one switch and at least one first multiplexer configured to route said input signals from said digital data inputs to said digital data outputs, wherein a first configuration of said at least one switch and said at least one first multiplexer provides a complex multiplication of said four input signals representing two complex numbers, and a second configuration of said at least one switch and said at least one first multiplexer provides parallel real multiplication of two pairs of input signals said four input signals representing four real numbers.

2. The hearing aid according to claim 1, wherein the calculation unit (100) further comprises three input adders (A1, A2, A3), and wherein, in the first configuration, each input adder (A1, A2, A3) receives a pair of input signals; and in the second configuration, a pair of input signals is provided to a first adder, and each of the remaining input signals is provided as a single input to the remaining input adders, respectively.

3. The hearing aid according to claim 2, wherein, in the first configuration, a first input adder receives a first and a second input signal, a second input adder receives a third input signal and a fourth input signal, and a third input adder receives the negative of the third input signal and the fourth input signal; and in the second configuration, the first input signal and the second input signal are provided to the first adder, the third input signal is provided to the third input adder, and the fourth input signal is provided to the third input adder.

4. The hearing aid according to claim 2, wherein the calculation unit (100) further comprises three multipliers (M1, M2, M3), wherein in the first configuration, each multiplier (M1, M2, M3) receives an input from an input signal and an input adder; and in the second configuration, two multipliers of the three multipliers (M1, M2, M3) receive input from an input signal and from an input adder which received a single input, and wherein the outputs from the two multipliers represent the two output signals of the second configuration.

5. The hearing aid according to claim 4, wherein in the first configuration, a first multiplier (M1) of the three multipliers (M1, M2, M3) receives input from the first input signal and the third input adder, a second multiplier (M2) receives input from the second input signal and the second input adder, and a third multiplier (M3) receives an input from the third input signal and the first input adder; and in the second configuration, the first multiplier (M1) receives input from the first input signal and the third input adder which received a single input, and the second multiplier (M2) receives input from the second input signal and the second input adder which received a single input.

6. The hearing aid according to claim 4, wherein the calculation unit (100) further comprises two output adders (A4, A5), wherein in the first configuration, each output adder (A4, A5) receives input from two of the three multipliers, and wherein the outputs from the two output adders (A4, A5) represent the two output signals of the first configuration.

7. The hearing aid according to claim 6, wherein in the first configuration, a first output adder (A4) receives input from the negative of the first multiplier (M1) and the second multiplier (M2), and a second output adder (A5) receives input from the negative of the second multiplier (M2) and the third multiplier (M3).

8. The hearing aid according to claim 1, further comprising:

a first data path configured to provide the output from at least one calculation unit (100) to a radix-sum unit (110) performing one or more operations on the signals, at least one of said operations comprising radix-2 or radix-4 summation (110), a second data path configured to bypass said radix-sum unit (110), a selector adapted to provide one of said data paths as the output of the digital processing unit (200).

9. The hearing aid according to claim 1, further comprising:

a second multiplexer, configured to provide two arbitrary complex valued signals or four arbitrary real valued signals as the four input signals to said digital processing unit.

10. The hearing aid according claim 1, wherein the processing unit (100) is configured to at least contribute to the calculations carried out by at least two of a frequency domain filter bank, a target gain calculator and a filter synthetization block.

11. A method (300) of operating a hearing aid comprising the steps of:

providing an input signal (301);

switching between using a calculation unit to:

carry out (303) a complex-valued multiplication of an input signal (301) representing two complex numbers; and to carry out (304) parallel real-valued multiplication of the input signal (301) representing two pairs of real numbers.

12. The method of claim 11, further comprising the steps of:

Calculating (305) a radix-2 sum or a radix-4 sum based on the result of the complex multiplication.

13. A non-transitory computer readable medium carrying instructions which, when executed by a computer, cause the method of the claim 12 to be performed.

14. The method according to claim 11 comprising the further steps of:

using the calculation unit to carry out calculations required by at least two of a frequency domain filter bank, a target gain calculator and a filter synthetization block.

15. A non-transitory computer readable medium carry instructions which, when executed by a computer, cause the method of the claim 14 to be performed.

16. A non-transitory computer readable medium carrying instructions which, when executed by a computer, cause the method of the claim 11 to be performed.

* * * * *